US008775071B2

(12) United States Patent
Achthoven

(10) Patent No.: US 8,775,071 B2
(45) Date of Patent: Jul. 8, 2014

(54) NAVIGATION DEVICE AND METHOD FOR DISPLAYING MAP INFORMATION

(75) Inventor: Olaf Achthoven, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 335 days.

(21) Appl. No.: 12/735,338

(22) PCT Filed: May 2, 2008

(86) PCT No.: PCT/EP2008/003701

§ 371 (c)(1),
(2), (4) Date: Jul. 7, 2010

(87) PCT Pub. No.: WO2009/132677

PCT Pub. Date: Nov. 5, 2009

(65) Prior Publication Data

US 2010/0280747 A1 Nov. 4, 2010

(51) Int. Cl.
*G01C 21/32* (2006.01)

(52) U.S. Cl.
USPC .......................................... 701/426; 701/438

(58) Field of Classification Search
USPC .................. 701/426, 428, 431, 436, 438, 454
See application file for complete search history.

(56) References Cited

U.S. PATENT DOCUMENTS

| | | | | |
|---|---|---|---|---|
| 6,360,168 B1* | 3/2002 | Shimabara | .................... | 701/436 |
| 6,856,901 B2* | 2/2005 | Han | .............................. | 701/532 |
| 7,818,119 B2* | 10/2010 | Arai et al. | .................... | 701/437 |
| 7,834,779 B2* | 11/2010 | He et al. | ........................ | 340/973 |
| 7,982,635 B2* | 7/2011 | Seong | ........................ | 340/995.1 |
| 8,160,815 B2* | 4/2012 | Geelen | ............................ | 701/410 |
| 8,170,795 B2* | 5/2012 | Brulle-Drews et al. | ........ | 701/431 |
| 8,195,386 B2* | 6/2012 | Hu et al. | ........................ | 701/436 |
| 8,339,399 B2* | 12/2012 | Snow | ............................. | 345/440 |
| 2002/0049534 A1* | 4/2002 | Yuda et al. | .................... | 701/209 |
| 2002/0163547 A1* | 11/2002 | Abramson et al. | ............. | 345/855 |
| 2004/0204845 A1* | 10/2004 | Wong | ............................ | 701/210 |
| 2004/0243306 A1* | 12/2004 | Han | ............................... | 701/211 |
| 2005/0015197 A1 | 1/2005 | Ohtusji et al. | | |
| 2005/0240311 A1 | 10/2005 | Rabitz | | |
| 2005/0270311 A1* | 12/2005 | Rasmussen et al. | ........... | 345/677 |
| 2007/0088495 A1 | 4/2007 | Ibrahim | | |

(Continued)

FOREIGN PATENT DOCUMENTS

| | | |
|---|---|---|
| CN | 1211765 C | 10/2002 |
| EP | 1 241 445 | 9/2002 |

(Continued)

*Primary Examiner* — Joseph C Rodriguez

(57) ABSTRACT

Methods and devices are disclosed for providing map information to a user. The map information corresponds to a field of view. In at least one embodiment, the navigation device includes an input device to receive an input for selecting a desired destination and a display device to display map information including a route to the desired destination, a ground level and at least one icon elevated above the ground level. The at least one icon represents an object within the field of view. In at least one embodiment, a method is disclosed for providing map information to a user via a navigation device and corresponding to a field of view is disclosed. In at least one embodiment, the method includes receiving at least one of an input and selection representing a desired destination and displaying map information including a route to the desired destination, a ground level and at least one icon elevated above the ground level. The at least one icon represents an object within the field of view.

28 Claims, 7 Drawing Sheets

(56) References Cited

U.S. PATENT DOCUMENTS

| | | |
|---|---|---|
| 2007/0106464 A1 | 5/2007 | Yamada |
| 2007/0150179 A1* | 6/2007 | Pinkus et al. .................. 701/208 |
| 2008/0208450 A1* | 8/2008 | Katzer ........................... 701/201 |
| 2009/0063047 A1* | 3/2009 | Ono ............................... 701/211 |
| 2009/0088964 A1* | 4/2009 | Schaaf et al. .................. 701/200 |
| 2009/0167568 A1* | 7/2009 | Seong .......................... 340/995.1 |
| 2009/0177987 A1* | 7/2009 | Jayakody ....................... 715/764 |
| 2010/0305842 A1* | 12/2010 | Feng ............................. 701/201 |

FOREIGN PATENT DOCUMENTS

| | | | |
|---|---|---|---|
| JP | 2004144720 A | 5/2004 | |
| JP | 2004286447 A | 10/2004 | |
| JP | 2006177814 A | 7/2006 | |
| JP | 2007108119 A | 4/2007 | |
| JP | 2007163437 A | 6/2007 | |
| TW | 200419476 A | 10/2004 | |
| WO | 2005093689 A1 | 10/2005 | |
| WO | WO 2009143870 A1 * | 12/2009 | ............. G01C 21/36 |

* cited by examiner

US 8,775,071 B2

NAVIGATION DEVICE AND METHOD FOR DISPLAYING MAP INFORMATION

FIELD

The present application generally relates to portable navigation devices and methods.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device. To aid in navigation of the route, map information is visually output along the route of travel to a user of the navigation device.

SUMMARY

The inventors discovered that objects can be difficult for a user to perceive within map information when the objects are displayed at ground level. Thus, the inventors have, in at least one embodiment, devised a method, device and/or computer readable medium for increasing visibility of one or more objects within the map information.

In at least one embodiment of the present application, a portable navigation device for providing map information to a user is disclosed. The map information corresponds to a field of view. The portable navigation device 200 includes an input device to receive at least one of an input and selection representing a desired destination and a display device to display map information including a route to the desired destination, a ground level and at least one icon elevated above the ground level. The at least one icon represents an object within the field of view.

In at least one embodiment of the present application, a method for providing map information to a user via a portable navigation device is disclosed. The map information corresponds to a field of view. The method includes receiving at least one of an input and a selection representing a desired destination and displaying map information including a route to the desired destination, a ground level and at least one icon elevated above the ground level. The at least one icon represents an object within the field of view.

In at least one embodiment of the present application, a portable navigation device for providing map information to a user is disclosed. The map information corresponds to a field of view. The portable navigation device 200 includes means for receiving at least one of an input and a selection representing a desired destination and means for displaying map information including a route to the desired destination, a ground level and at least one icon elevated above the ground level. The at least one icon represents an object within the field of view.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
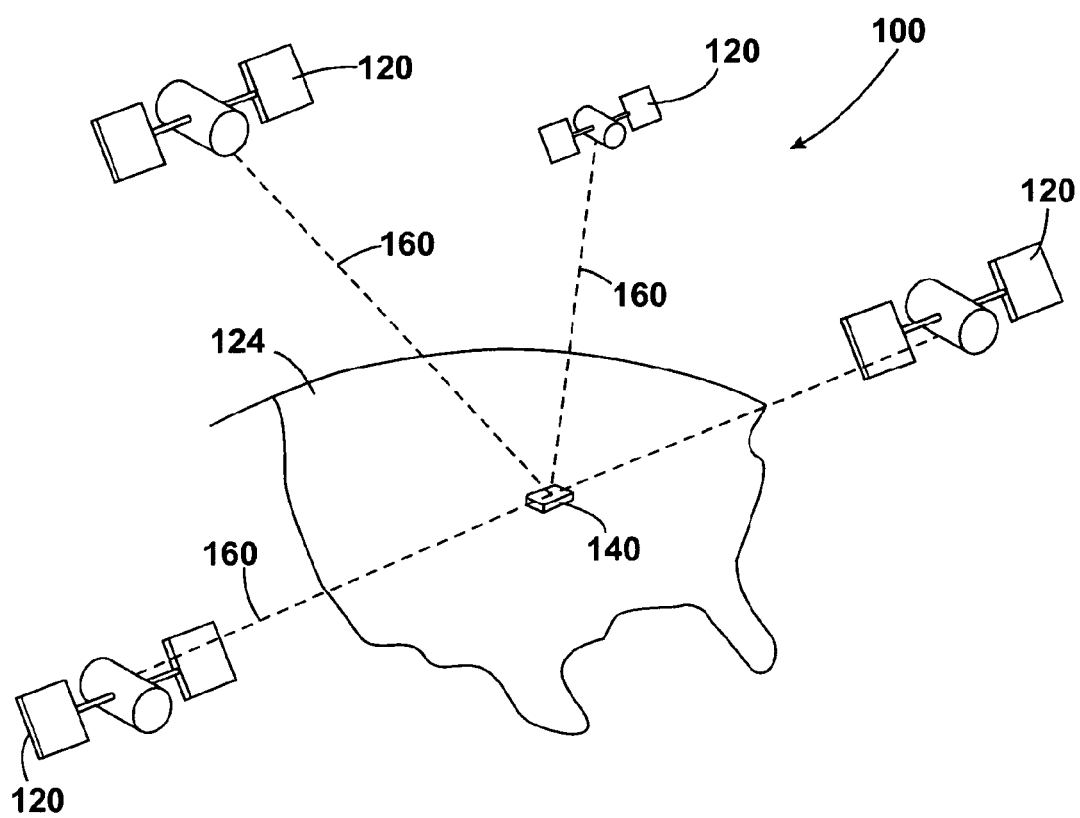
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of a Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
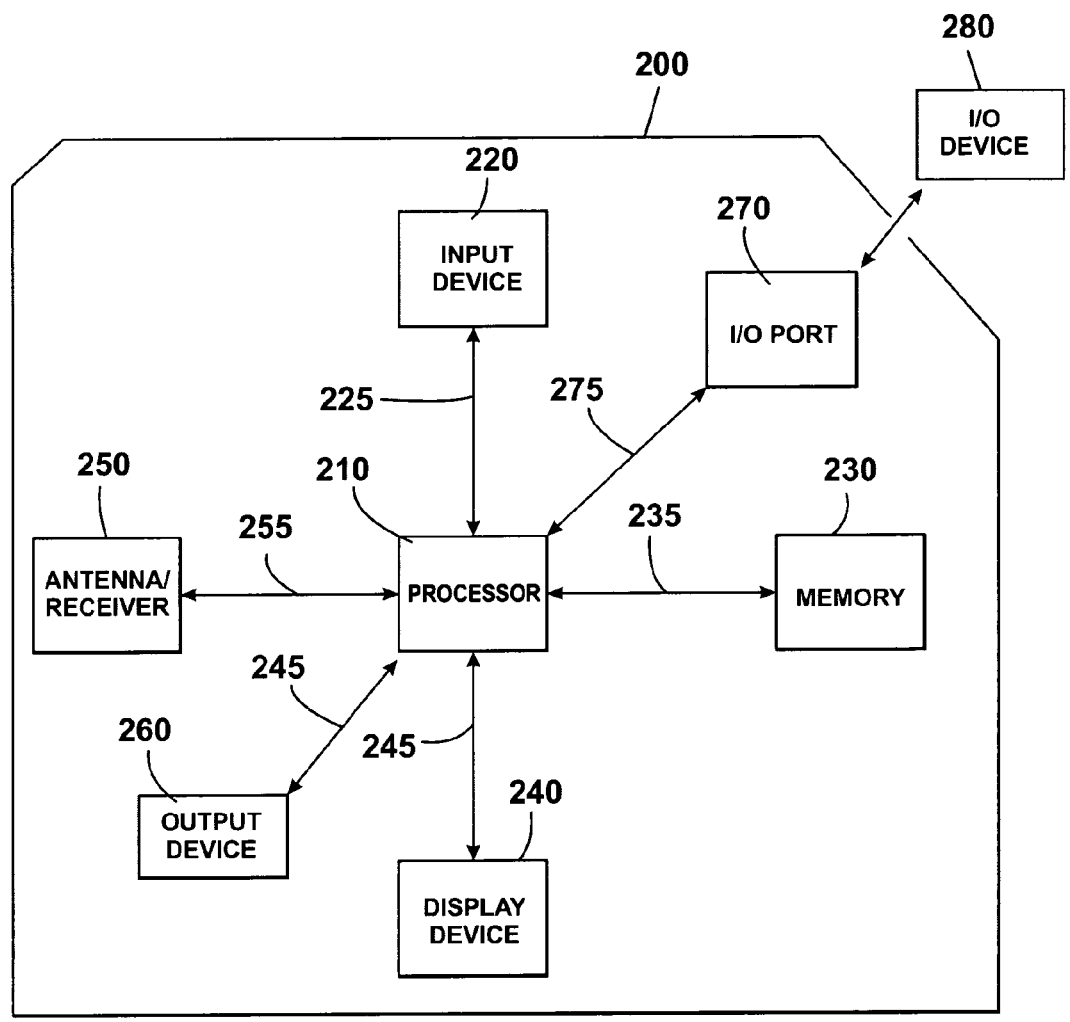
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
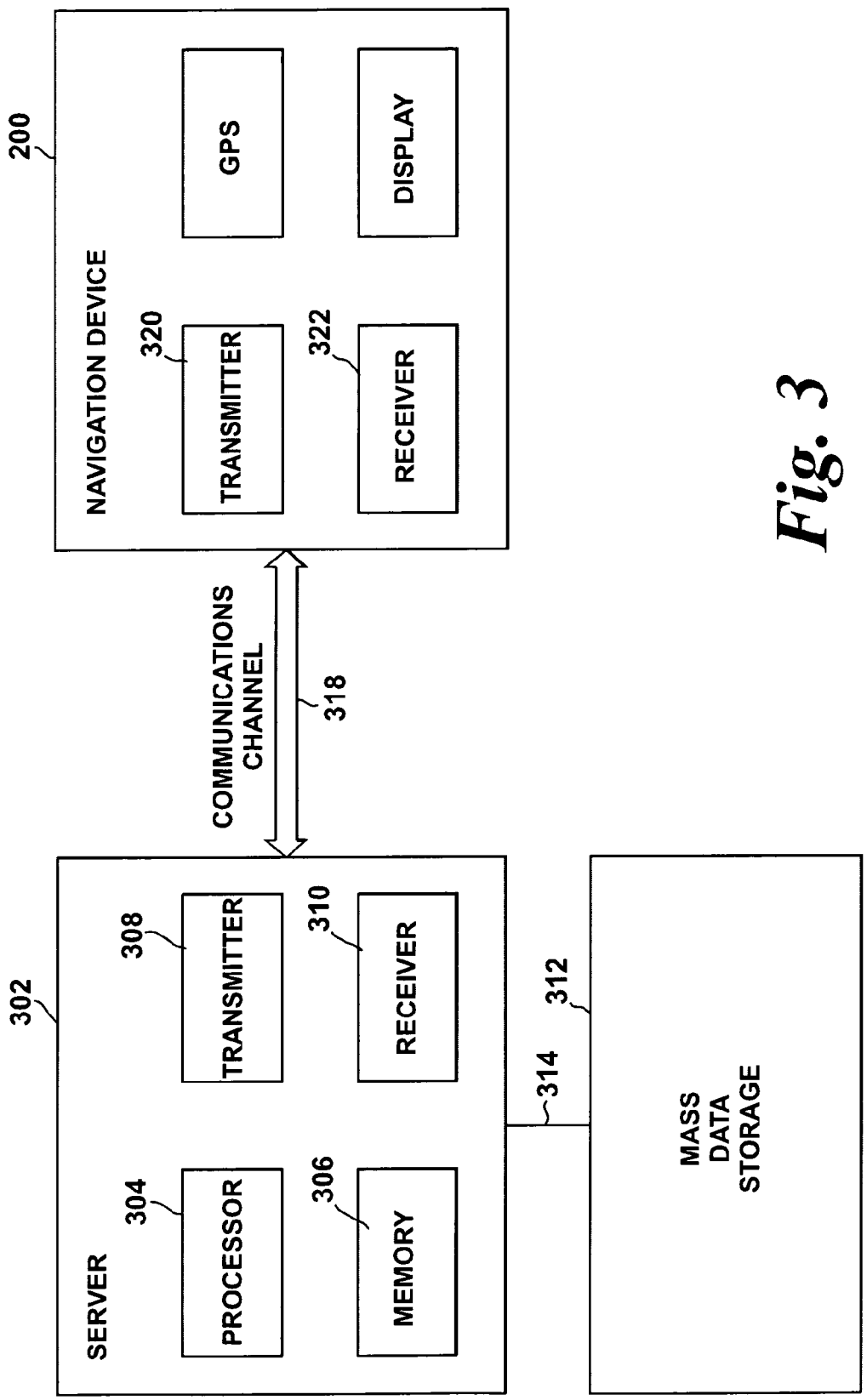
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes a processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
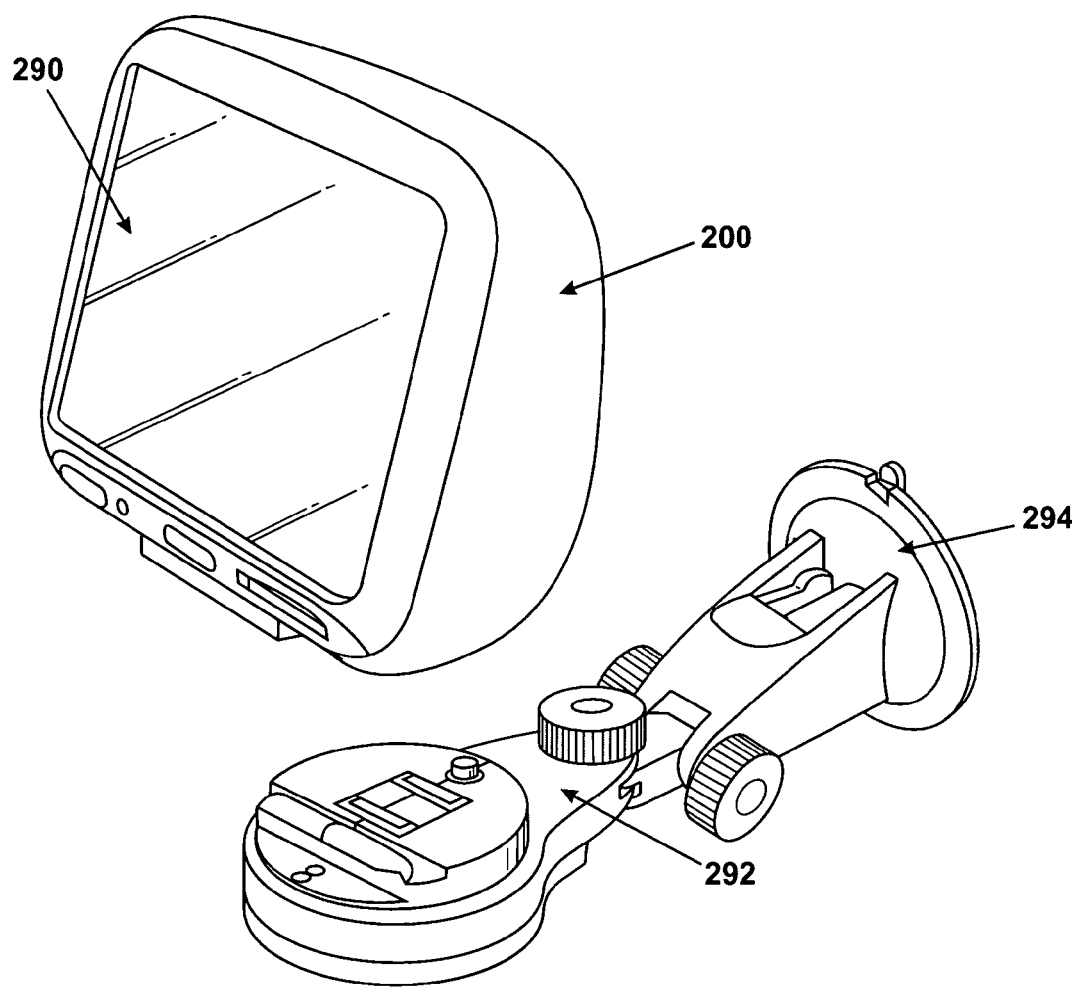
FIGS. 4A and 4B are perspective views of an implementation of an embodiment of the navigation device 200.
Figure 4B:
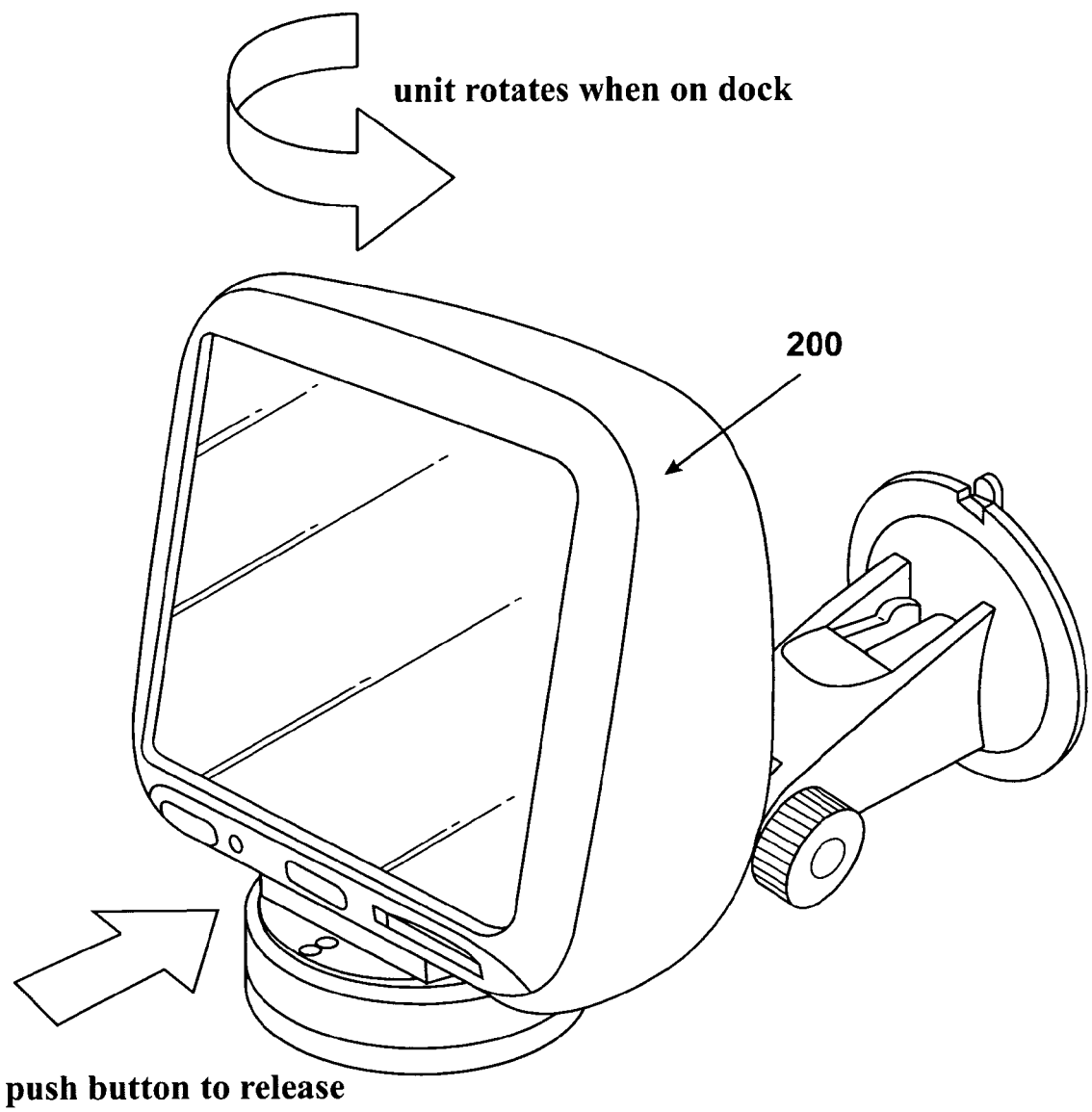

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

In at least one embodiment of the present application, a portable navigation device 200 for providing map information to a user is disclosed. The map information corresponds to a field of view. The portable navigation device 200 includes an input device 220 to receive at least one of an input and a selection representing a desired destination and a display device 240 to display map information including a route to the desired destination, a ground level and at least one icon elevated above the ground level. The at least one icon represents an object within the field of view.

In at least one embodiment of the present application, a method for providing map information to a user via a portable navigation device 200 is disclosed. The map information corresponds to a field of view. The method includes receiving at least one of an input and a selection representing a desired destination and displaying map information including a route to the desired destination, a ground level and at least one icon elevated above the ground level. The at least one icon represents an object within the field of view.

In at least one embodiment of the present application, a portable navigation device 200 for providing map information to a user is disclosed. The map information corresponds to a field of view. The portable navigation device 200 includes means for receiving at least one of an input and a selection representing a desired destination and means for displaying map information including a route to the desired destination, a ground level and at least one icon elevated above the ground level. The at least one icon represents an object within the field of view.

FIGS. 5-9 illustrate example embodiments of the present application.

Figure 5:
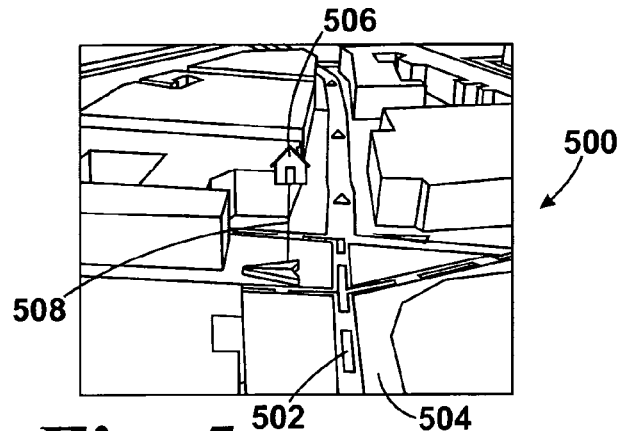
FIG. 5 illustrates an example display according to the present application.
Figure 6A:
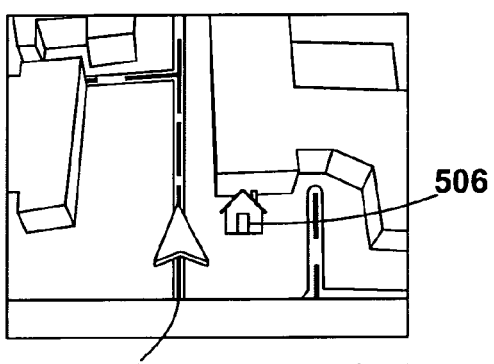
FIG. 6A-B illustrate different views of the example display of FIG. 5.
Figure 6B:
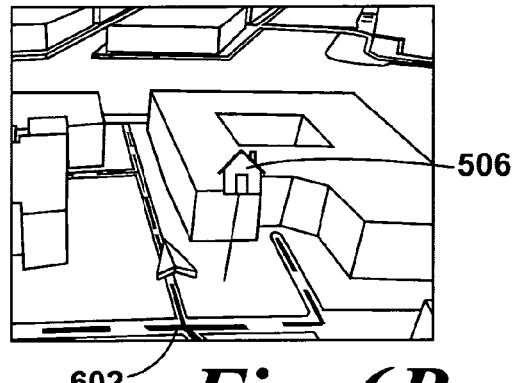

As shown in FIG. 5, an example display 500 for display on a display device 240 of a portable navigation device 200 is illustrated. The example display 500 includes map information, which realistically represents the field of view defined by the display device 240. In use, a user provides an input to the portable navigation device 200 selecting a desired destination. The portable navigation device 200 receives the input from the user via the input device 220. The display device 240 displays the map information including a route between the start position (current position of the portable navigation device 200 obtained via GPS for example) and the desired destination (input or selected by a user for example). The route is included in example display 500 and referenced 502. The map information also includes a ground level 504. It should be appreciated that the input device 220 and the display device 240 can be included in an integrated input and display device 290 in embodiments of the present application.

The map information also includes an icon 506. The icon 506 is elevated above the ground level 504 included in the map information of the example display 500. The icon 506 represents an object within the field of view of the example display 500. By elevating the icon 506 above the ground level 504, a user of the portable navigation device 200 may better view the location of the object represented by the icon 506 relative to the route or map information, such as buildings, displayed on the display device 240. As shown in the example display of FIG. 5, the icon 506 illustrated represents a home location. An input designating the home location is received by the portable navigation device 200, through an input from the user or a pre-programmed setting. In response to the input, the portable navigation device 200 elevates an icon representing the home location when the home location is within the field of view corresponding to the map information displayed on the display device 240 (wherein the processor 210 may control display of this information by, for example, determining when the home location is within the field of view of the map information currently displayed, the current map information display being based upon the current location of the navigation device 200 and the determined route of travel).

Objects represented by at least one icon in map information can include, for example, any object included content of an actual view of the area represented by the map information. Specifically, an object may include for example a start point, a present location, a desired destination, any point along a route (e.g., an exit ramp), a user designated location, a point of interest, a home location, a favorite location, a building, a structure, a waterway, an itinerary waypoint, route instructions, traffic equipment (e.g., a traffic light, a traffic camera, a sign, etc.), or another object within the field of view or related to an instruction regarding a route displayed by a portable navigation device. Specifically, a point of interest may include but is not limited to any one of a government office, a mountain peak, open parking, a parking garage, a petrol station, a railway station, a rest area, an airport, a car dealership, a casino, a church, a cinema, a city centre, a company, a concert hall, a courthouse, a cultural centre, a exhibition centre, a ferry terminal, a border crossing, a golf course, a hospital/clinic, a hotel, a motel, a tourist attraction, a mountain pass, a museum, an art gallery, an opera house, an opera, a place of worship, a post office, a shipping company, a car rental facility, a restaurant, a shop, a mall, a shopping centre, a stadium, a sports arena, a theatre, a tourist information office, a zoo, a sports centre, a police station, a firehouse, an embassy, a college or university, a cash dispenser, a beach, an ice skating rink, a tennis court, a water sport, a doctor, a dentist, a veterinarian, nightlife, an amusement park, a library, a car repair/garage, a pharmacy, a scenic view, a panoramic view, a swimming pool, a winery, a distiller, a camping ground, a park and recreation area, a convention center, a leisure centre, a marina, a yacht basin, a postcode, a legislator, a lawyer, a solicitor, a counselor, etc.

It should be appreciated that, in other embodiments of the present application, one or more objects may be represented by an icon elevated above a ground level in the map information and one or more objects may be represented by an un-elevated icon in the same map information. The determination of which icons are elevated may be provided by a user, a portable navigation device 200, or some combination of the user and the portable navigation device 200.

In the example display 500, the icon 506 is displayed as positioned at an end of a pole 508. The other end of the pole 508 extends to the ground level 504. The pole 508 extends to the ground level 504 at a position in which the object represented by the icon would be positioned within in the map information, but for the icon being elevated (i.e., the objects position within the field of view). In this particular embodiment, the pole 508 is just taller than a tallest building within the map information. In this manner, the user is able to understand the position of the object, represented by the icon, relative to the map information displayed in the display device 240. In other embodiments of the present application, another marking, three-dimensional or two-dimensional, and height of marking may be used to extend from the ground level to the icon. For example, a marking (e.g., a dotted line of a standard height) may be included between the icon and a ground level location of an object represented by the at least one elevated icon within the map information.

In the example display 500, the icon is two-dimensional. In at least embodiments of the present application, when an icon is displayed as two-dimensional, a portable navigation device 200 may display the icon via billboarding. When an icon is displayed via billboarding, the icon 506 is displayed such that the icon 506 is visible to the user regardless of an orientation of an object represented by the icon 506 on portable navigation device 200 (compare FIGS. 5 and 6A-B). As a user proceeds along the route from FIG. 5 to FIG. 6A, the user turns at corner 602. When the user turns, the orientation of the user to the icon 506 is changed so that, the icon 506 "faces" the user. In this manner, the icon 506 is visible to the user regardless of the orientation of the object.

In at least one other embodiment of the present application, an icon may be a three-dimensional icon. When a three-dimensional icon is used, orientation of the icon may be preserved relative to map information included in a display. In this manner, regardless of the direction of a user's view, the user can view the proper orientation of the icon. For example, when the back of an object would be visible from a user's current location, a three-dimensional icon representing the object may be elevated and displayed such that the back of the three-dimensional icon is visible to the user via display device 240. When the user's location changes, the orientation of the three-dimensional icon is preserved relative to the map information, not the user. Accordingly, the user is able to view the three-dimensional icon (from the side, front, back, etc.) as the object would be viewed from the user's location in the actual field of view. It should be appreciated that the orientation of a two-dimensional icon may be preserved relative to the map information and the orientation of a three-dimensional icon may be displayed via billboarding in other embodiments of the present application.

Figure 7:
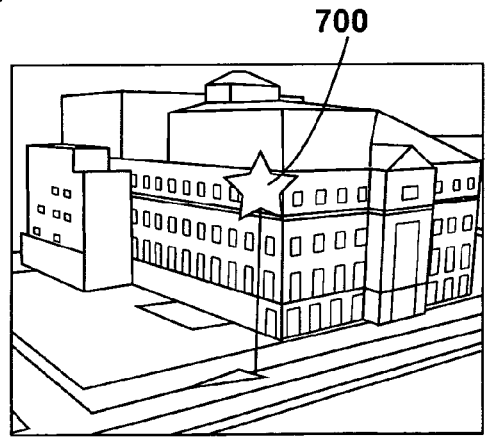
FIG. 7 illustrates an example view of map information including an icon representing a favorite location.

Further, an icon included in an embodiment of the present application may be related to an object, which the icon represents. As shown in FIG. 5, icon 506 represents a home location. The icon 506 used to represent the home location is a generic house. In other embodiments of the present application, an icon may be unrelated to the nature or content of the object, which the icon represents. For example, as shown in FIG. 7, a star icon 700 represents a favorite location, an ice cream store. The star does not does not physically represent the favorite place, but instead, is assigned by a user. Other generic icons (e.g., heart, cross, exclamation point, smiley face, letter, etc.) may be include to represent one or more objects, as assigned by a user and/or preprogrammed into a portable navigation device 200. In still other embodiments, an icon may be a replica of the object's physical appearance. In this manner, various views of the icon may be viewable within the map information. In still other embodiments of the present application, an icon can be animated. For example, a countries flag may be used to represent an embassy for a particular country. As displayed on the portable navigation device 200, the flag icon can be animated, such that the flag waves in the wind. Other icons may be animated in other embodiments, such as a desired destination icon represented by a waving checkered flag. Also, map information including a shadow associated with an icon. The shadow may be included to aid a user in identifying a location of an object and/or further distinguish the icon from other map information displayed on the display device 240.

It should be appreciated that different types of icons (e.g., generic, replica, animated, two-dimensional, three-dimensional, or some combination thereof) may be employed, lone or in combination, in various embodiments of the present application.

Figure 8:
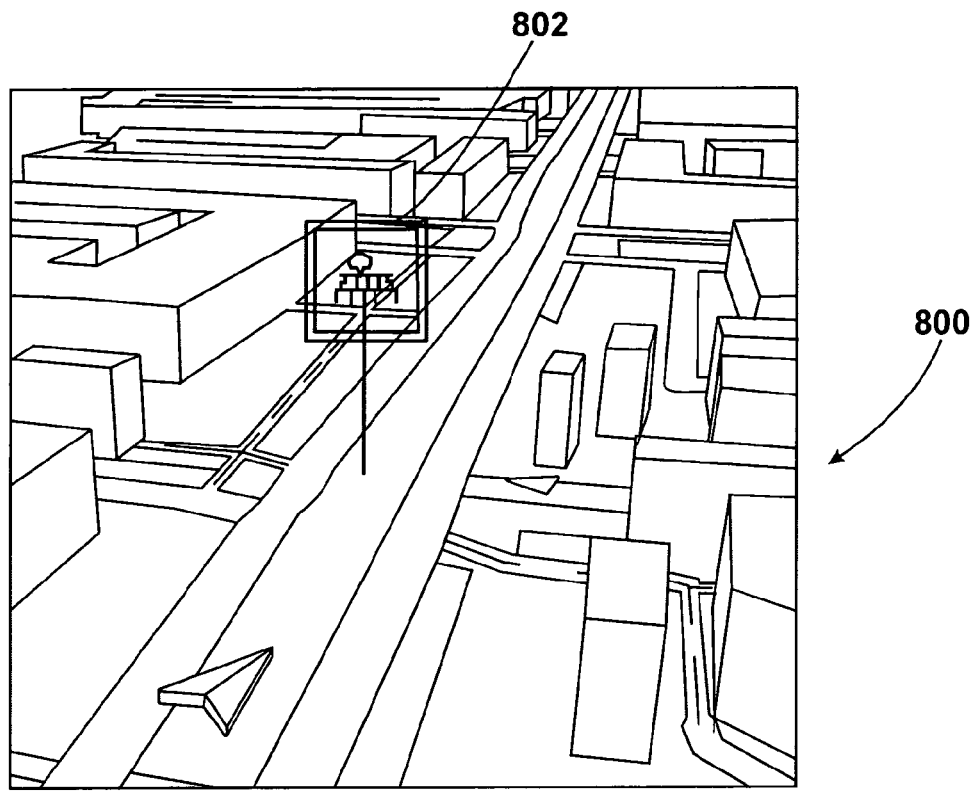
FIG. 8 illustrates an example view of map information including a semi-transparent icon.

As multiple icons may be displayed on the display device 240, the map information displayed may become obscured by one or more icons. Accordingly, one or more icons may be altered to preserve the visibility of map information to the user. In at least one embodiment of the present application, an icon may become transparent based on screen coverage of the icon. As shown in FIG. 8, an example display 800 includes an icon 802, which is partially transparent such that the map information behind the icon is visible. In this example, because the screen coverage exceeds seventy-five (75) pixels, the icon has been reduced to 50% visibility (i.e., 50% transparency). It should be appreciated that in other embodiments, a different number of pixels may be employed to determine a different transparency for a particular icon displayed on a portable navigation device 200. For example, an icon may start to become transparent at 50 pixels, and become increasingly transparent as the number of pixels covered increases. In this example, at 100 pixels screen coverage, the icon becomes totally transparent.

In at least one other embodiment of the present application, an icon may become transparent based on a distance of the icon from a determined route of travel (the route being determined based upon an initial location of the navigation device 200 and an input or selected final destination, for example). The icon becomes transparent at some minimum distance from the route of travel, and continues to become transparent until some maximum distance from the route of travel. At the maximum distance, the icon becomes totally transparent. For example, an icon representing an object more than a certain number of miles from a route of travel may be completely transparent; while an icon representing an object a different number of miles from the route of travel may be only a certain percentage visible. In this example, at a certain number of miles, the icon becomes totally visible.

It should be appreciated that the transparency of an icon may be cumulatively altered based on more than one of the conditions described above and/or below. For example, an icon may become transparent based on screen coverage of icon and distance of the icon from the route of travel. For an icon covering 75 pixels (50% visible, 50% transparent) and one mile from the route of travel (50% visible, 50% transparent), the icon would be displayed as 25% visible (50% visible×50% visible=25% visible) within the map information.

Alternatively or additionally, the size of an icon may be altered to preserve visibility of map information displayed on displayed device 240 of portable navigation device 200. In at least one example, the size of an icon may be based on the distance of the icon from the route of travel. For objects closer to the route, an icon representing the object may be larger than an icon representing an object further away from the route, such that a user can distinguish between objects. In one example, a user may select a fuel station represented by an larger icon, i.e., closer to the route. By icon size indications, a user may easily choose to visit objects closest to the route to minimize impact on reaching the desired destination. It should be appreciated that size of an icon may indicate other conditions for the objects represented by the icon in other embodiments of the present application. For example, in the context of fuel stations, larger icons may indicate a user preferred brand of fuel.

Figure 9:
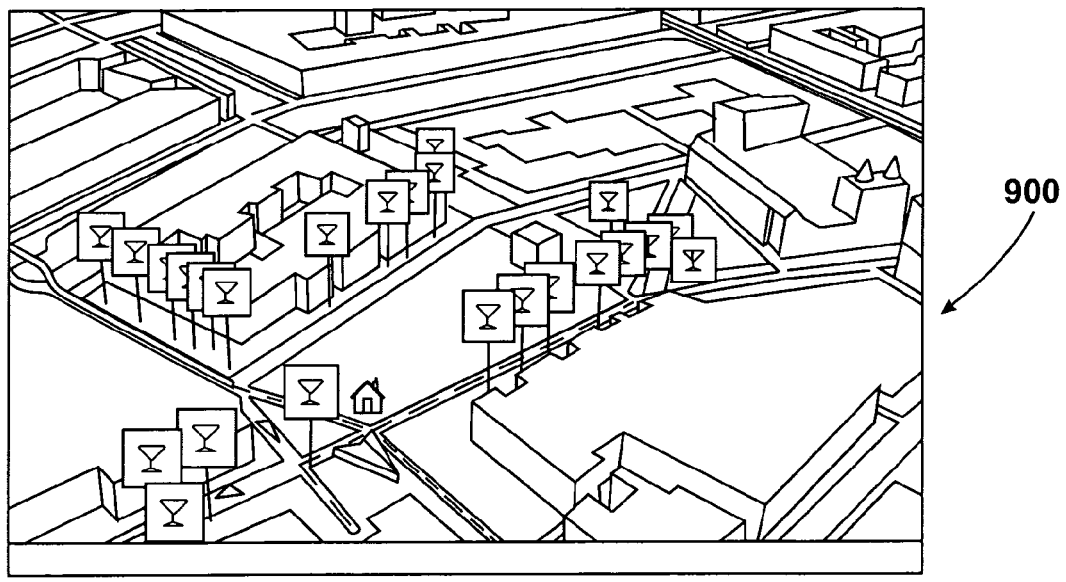
FIG. 9 illustrates an example view of map information including a plurality of icons.

As shown in FIG. 9, an example display 900 includes a plurality of icons. As the number of icon increases, the amount of map information displayed on a display device 240 may be decreased. In at least one embodiment of the present application, a portable navigation device 200 may limit the number of icons in the map information to a predetermined number. For example, a portable navigation device 200 may be preprogrammed with a predetermined number of a twenty-five (25) icons. When more than 25 icons are within the map information, the portable navigation device 200 displays only the predetermined number of icons closest to the portable navigation device. Thus, the twenty-five icons closest to the portable navigation device 200 are displayed on the display device 240. In another embodiment, a portable navigation device 200 may display the predetermined number of icons based on a different criteria, such as proximity to a route of travel, proximity to a desired destination, proximity to point of interest, classification of an object represented by an icon (e.g., display all favorite locations first), etc.

Further, in at least one embodiment of the present application, an icon is positioned on one end of a pole with the other end extending to the ground level. As described above, the location at which the pole intersects the ground level is the position of the object within the field of view. Depending on the map information displayed, the location at which the pole intersects the ground level may be obstructed. In such a condition, the icon may be less helpful to a user than a fully viewable icon. Accordingly, the partially obscured icon may be omitted to display fully viewable icons and/or maximize the amount of map information displayed on display device 240. In other embodiments of the present application, one or more of the methods described above with reference to multiple icons may be employed to preserve the display of map information and/or at least one icon.

The embodiment of the present application discussed above included a navigation device 200, which is a portable navigation device. However, the embodiments, methods and devices explained above are not limited as such. Aspects, embodiments, methods and devices explained above are further applicable to a navigation device, which is integrated into a vehicle. Such a navigation device may be, for example, integrated into a dashboard or other portion of a vehicle. Such a vehicle may include, but is not limited to a car, truck, boat, motorcycle, etc. In at least one embodiment, such a navigation device integrated in a vehicle may be used to perform the various aspects of the method described with regard to FIG. 5, as would be understood by one of ordinary skill in the art. Thus, further explanation is omitted for the sake of brevity.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor 210 or other computer device. In varying embodiments, the medium may be a magnetic medium, electronic medium, optical medium, etc.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A navigation device for providing map information to a user, the map information corresponding to a field of view, the navigation device comprising:
    a processor;
    a memory;
    an input device to receive at least one of an input and a selection representing a desired destination; and
    a display device to display map information including a route to the desired destination, a ground level, and at least one icon elevated above the ground level, the at least one icon representing an object within the field of view using the processor;
    the processor being operable to elevate the at least one icon above the ground level when the navigation device is within a predetermined distance from the desired destination, and
    the processor being further operable to cause the at least one icon to become at least partially transparent based on at least one of screen coverage of the at least one icon and distance of the at least one icon from the route.

2. The navigation device of claim 1, wherein the at least one icon is displayed as positioned at an end of a pole which extends to the ground level.

3. The navigation device of claim 1, wherein the at least one icon is displayed such that the icon is visible to the user regardless of an orientation of an object represented by the at least one icon.

4. The navigation device of claim 1, wherein the at least one icon represents at least one of a start point and the desired destination for the route.

5. The navigation device of claim 1, wherein the at least one icon represents at least one of a point of interest, a user designated location, a home location, and an itinerary waypoint.

6. The navigation device of claim 1, wherein the at least one icon represents a traffic device along the route.

7. The navigation device of claim 1, wherein the at least one icon is displayed as a three-dimensional icon.

8. The navigation device of claim 1, wherein a size of the at least one icon is based on a distance of the at least one icon from the route.

9. The navigation device of claim 1, wherein the at least one icon is an animated model of an object represented by the at least one icon.

10. The navigation device of claim 9, wherein the navigation device is a portable navigation device.

11. The navigation device of claim 9, wherein the navigation device is integrated into a vehicle.

12. A method of providing map information to user via a navigation device, the map information corresponding to a field of view, the method comprising:
- receiving at least one of an input and a selection representing a desired destination; and
- displaying map information including a route to the desired destination, a ground level and at least one icon elevated above the ground level, the at least one icon representing an object within the field of view;
- wherein the at least one icon is elevated above the ground level when the at least one icon is located within the field of view corresponding to the map information being displayed, and
- wherein the at least one icon becomes at least partially transparent based on at least one of screen coverage of the at least one icon and distance of the at least one icon from the route.

13. The method of claim 12, wherein the at least one icon represents at least one of a start point, the desired destination for the route, a point of interest, a user designated location, a home location, and an itinerary waypoint.

14. The method of claim 12, wherein the at least one icon is displayed as positioned at an end of a pole which extends to the ground level.

15. The method of claim 12, wherein the at least one icon represents a traffic device along the route.

16. The method of claim 13, further comprising limiting a number of icons in the map information to a threshold number.

17. The method of claim 13, wherein the map information includes a shadow associated with the at least one icon.

18. The method of claim 13, wherein the size of the at least one icon is based on a distance of the at least icon from the route.

19. The method of claim 13, wherein the at least one icon is at least one of three-dimensional and animated.

20. A navigation device for providing map information to a user, the map information corresponding to a field of view, the navigation device comprising:
- a processor;
- a memory;
- means for receiving at least one of an input and a selection representing a desired destination; and
- means for displaying map information including a route to the desired destination, a ground level and at least one icon elevated above the ground level, the at least one icon representing an object within the field of view;
- wherein the navigation device elevates the at least one icon above the ground level when the navigation device is within a predetermined distance from the desired destination, and
- wherein the at least one icon becomes at least partially transparent based on at least one of screen coverage of the at least one icon and distance of the at least one icon from the route.

21. The navigation device of claim 20, wherein the map information includes a pole between the at least one icon and a ground level location of an object represented by the at least one icon within the map information.

22. The navigation device of claim 20, wherein the at least one icon includes a plurality of icons limited to a threshold number.

23. The navigation device of claim 20, wherein the at least one icon represents a point of interest.

24. The navigation device of claim 20, further comprising means for processing the map information to elevate the at least one icon above the ground level.

25. The navigation device of claim 20, wherein the navigation device is a portable navigation device.

26. The navigation device of claim 20, wherein the navigation device is integrated into a vehicle.

27. The navigation device of claim 1, wherein the at least one icon is one of a plurality of icon types selectable by the user or preprogramed into the navigation device.

28. The navigation device of claim 1, wherein the transparency of the at least one icon becomes increasingly transparent as the distance of the at least one icon from the route increases.

* * * * *